US009075215B2

(12) United States Patent
Hurley et al.

(10) Patent No.: US 9,075,215 B2
(45) Date of Patent: Jul. 7, 2015

(54) DUPLEX CABLES AND ZIPCORD CABLES AND BREAKOUT CABLES INCORPORATING DUPLEX CABLES

(75) Inventors: William C. Hurley, Hickory, NC (US); Curtis P. Queen, Newton, NC (US)

(73) Assignee: Corning Cable Systems LLC, Hickory, NC (US)

( * ) Notice: Subject to any disclaimer, the term of this patent is extended or adjusted under 35 U.S.C. 154(b) by 192 days.

(21) Appl. No.: 13/207,973

(22) Filed: Aug. 11, 2011

(65) Prior Publication Data

US 2011/0293229 A1 Dec. 1, 2011

Related U.S. Application Data

(63) Continuation of application No. PCT/US2010/024279, filed on Feb. 16, 2010.

(60) Provisional application No. 61/152,937, filed on Feb. 16, 2009.

(51) Int. Cl.
*G02B 6/44* (2006.01)
*G02B 6/028* (2006.01)
*G02B 6/036* (2006.01)

(52) U.S. Cl.
CPC ............ *G02B 6/4432* (2013.01); *G02B 6/0288* (2013.01); *G02B 6/0365* (2013.01)

(58) Field of Classification Search
None
See application file for complete search history.

(56) References Cited

U.S. PATENT DOCUMENTS

| | | | | |
|---|---|---|---|---|
| 4,659,174 A | | 4/1987 | Ditscheid et al. | 350/96.23 |
| 5,627,932 A | * | 5/1997 | Kiel et al. | 385/102 |
| 5,630,003 A | * | 5/1997 | Arroyo | 385/113 |
| 5,822,485 A | | 10/1998 | Nelson et al. | 385/112 |
| 6,068,796 A | * | 5/2000 | Graham et al. | 264/1.28 |
| 6,389,204 B1 | | 5/2002 | Hurley | 385/102 |
| 6,487,347 B2 | | 11/2002 | Bringuier | 385/113 |
| 6,775,444 B1 | | 8/2004 | Hurley | 385/104 |
| 7,054,531 B2 | | 5/2006 | Hurley et al. | 385/106 |
| 7,113,680 B2 | | 9/2006 | Hurley et al. | 385/113 |
| 7,397,991 B1 | | 7/2008 | Register | 385/102 |
| 7,986,863 B2 | | 7/2011 | Fruhnert | 385/100 |
| 8,218,925 B2 | | 7/2012 | Bohler et al. | 385/107 |
| 2006/0280413 A1 | * | 12/2006 | Paschal et al. | 385/112 |
| 2008/0145011 A1 | | 6/2008 | Register | 385/128 |
| 2008/0253730 A1 | * | 10/2008 | Cox et al. | 385/138 |
| 2011/0091173 A1 | * | 4/2011 | Register, III | 385/113 |
| 2011/0135259 A1 | | 6/2011 | Guenter et al. | 385/103 |
| 2012/0007717 A1 | * | 1/2012 | Jong | 340/10.4 |

FOREIGN PATENT DOCUMENTS

| | | |
|---|---|---|
| EP | 0126509 A2 | 11/1984 |
| EP | 0349312 A2 | 1/1990 |
| JP | 2000-206380 A | 7/2000 |
| JP | 2001-194567 A | 7/2001 |

OTHER PUBLICATIONS

Patent Cooperation Treaty, International Search Report and Written Opinion for International Application No. PCT/US2010/024279; Mailing Date Jul. 11, 2012 —15 pages.

* cited by examiner

*Primary Examiner* — Sarah Hahm
(74) *Attorney, Agent, or Firm* — William D. Doyle

(57) ABSTRACT

Interconnect cables utilize bend-insensitive fibers and relatively large free space areas in the cable jackets to reduce bend-induced delta attenuation. Tensile yarns can be included as strain-relief components, but can be relatively loosely packed in order to inhibit bend-induced attenuation.

18 Claims, 5 Drawing Sheets

US 9,075,215 B2

DUPLEX CABLES AND ZIPCORD CABLES AND BREAKOUT CABLES INCORPORATING DUPLEX CABLES

PRIORITY APPLICATION

This application is a continuation of International Application No. PCT/US2010/024279, filed Feb. 16, 2010, which claims the benefit of priority to U.S. Prov. App. No. 61/152,937, filed Feb. 16, 2009, both applications being incorporated herein by reference.

TECHNICAL FIELD

The present disclosure relates generally to fiber optic duplex cables and assemblies including multimode optical fibers.

BACKGROUND

With the increase in the deployment of optical networks such as data centers, a need has arisen for increasing the performance, manageability, bend tolerance, handleability and flexibility of fiber optic assemblies such as cables, cable assemblies and network components in general. Unlike long-haul applications, data centers and the like typically use multimode optical fibers instead of single-mode optical fibers. Due to its relatively large core, a multimode optical fiber is more sensitive to events that cause optical attenuation when compared with a single-mode optical fiber, which has a smaller core.

In data center applications, the large volume of cables restricts air flow among the data center equipment, which increases cooling costs for the data center. Small duplex cables can be utilized to increase data capacity without unduly increasing cooling costs. One conventional duplex cable has a pair of fibers disposed in a cavity of the cable. The fibers could become intertwined, however, causing attenuation losses. Another duplex cable the "zipcord" cable—includes one fiber in each individual leg of the cable. Zipcord cables have relatively large cross-sections however given their capacity to transmit data. A third conventional duplex cable has two fibers bound in a ribbon. Ribbonized fibers, however, may be difficult to separate from each other for connectorization.

SUMMARY

According to one embodiment, a duplex cable comprises a polymer jacket, a pair of optical waveguides in the jacket, and a strain-relief component enclosed within the jacket and contacting the optical waveguides. The cable may have low delta attenuation, so that when the cable is wrapped around a 5.8 mm mandrel four times, delta attenuation due to the wraps is less than 1.0 db at 1300 nm and at 850 nm.

According to one aspect, the strain-relief component may include a plurality of tensile yarns that allow the fibers to move about within the interior of the cable jacket so as to reduce bending stresses on the fibers. The tensile yarns, which may be unstranded, fluff out and fill the cable free space but not to a degree that they unduly restrict movement of the fibers. The free space inside the cable jacket may occupy at least 13 percent of the cross-sectional area of the cable.

According to another embodiment, a plurality of duplex cables according to the present embodiments can be enclosed in a jacket to form a breakout cable.

According to yet another embodiment, a pair of duplex cables according to the present embodiments can be joined by a web to form a zipcord cable.

Those skilled in the art will appreciate the above stated advantages and other advantages and benefits of various additional embodiments reading the following detailed description of the embodiments with reference to the below-listed drawing figures.

BRIEF DESCRIPTION OF THE DRAWING FIGURES

The present embodiments are explained in more detail below with reference to figures which show the exemplary embodiments.

DETAILED DESCRIPTION

The embodiments will now be described more fully hereinafter with reference to the accompanying drawings in which exemplary embodiments are shown. However, practice of the disclosure may be embodied in many different forms and should not be construed as limited to the embodiments set forth herein. The exemplary embodiments are provided so that this disclosure will be both thorough and complete, and will fully convey the scope of the claims and enable one of ordinary skill in the art to make, use and practice the same. Like reference numbers refer to like elements throughout the various drawings.

Disclosed are multimode fiber optic cables and other assemblies having macro-bend resistant optical fibers. The multimode assemblies are advantageous since they preserve and provide optical performance that was not attainable with conventional multimode fiber optic assemblies. Multimode fiber optic assemblies disclosed herein provide stability for higher order modes that are unstable even in short lengths. Generally speaking, the higher order modes transmitted by multimode optical fiber assemblies are more sensitive to macro-bending and/or other pertubations. For instance, the multimode fiber optic assemblies disclosed provide improved performance compared with conventional multimode fiber optic assemblies. Consequently, multimode assemblies disclosed herein allow aggressive bending for installation, routing, slack storage, higher densities and the like, thereby allowing rugged installations both by the craft and untrained individuals. Multimode fiber optic assemblies include multimode fiber optic ribbons, fiber optic jumpers such as single or duplex interconnect cables and jumpers, and higher fiber count jumper assemblies, modules, fiber optic pigtails, assemblies having one or more hardened connectors, and the like.

Figure 1:
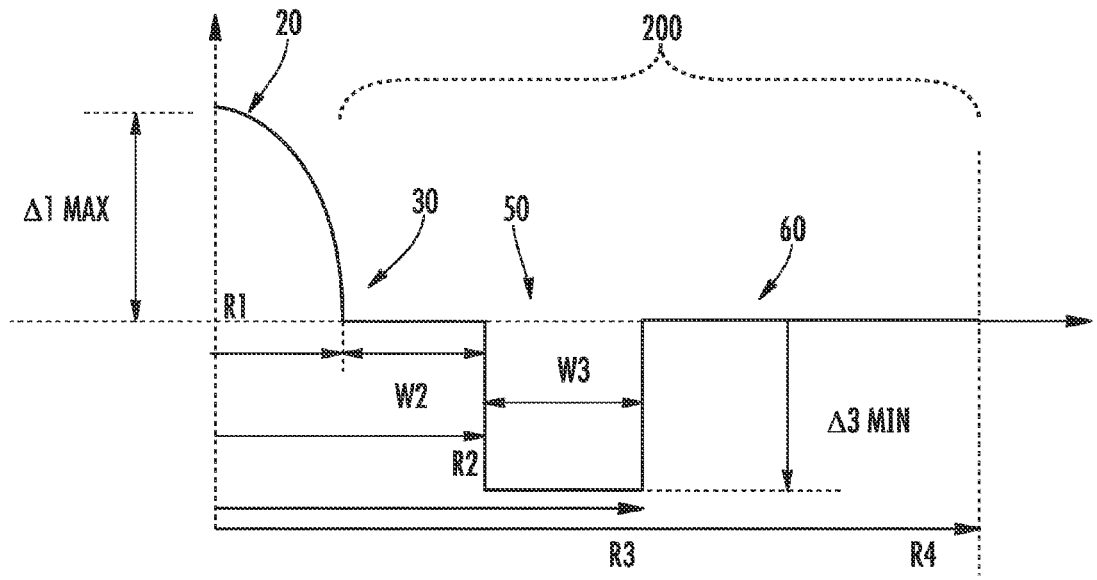
FIG. 1 is a schematic representation (not to scale) of the refractive index profile of a cross-section of the glass portion of an exemplary embodiment of multimode optical fiber disclosed herein wherein the depressed-index annular portion is offset from the core and is surrounded by an outer annular portion.
Figure 2:
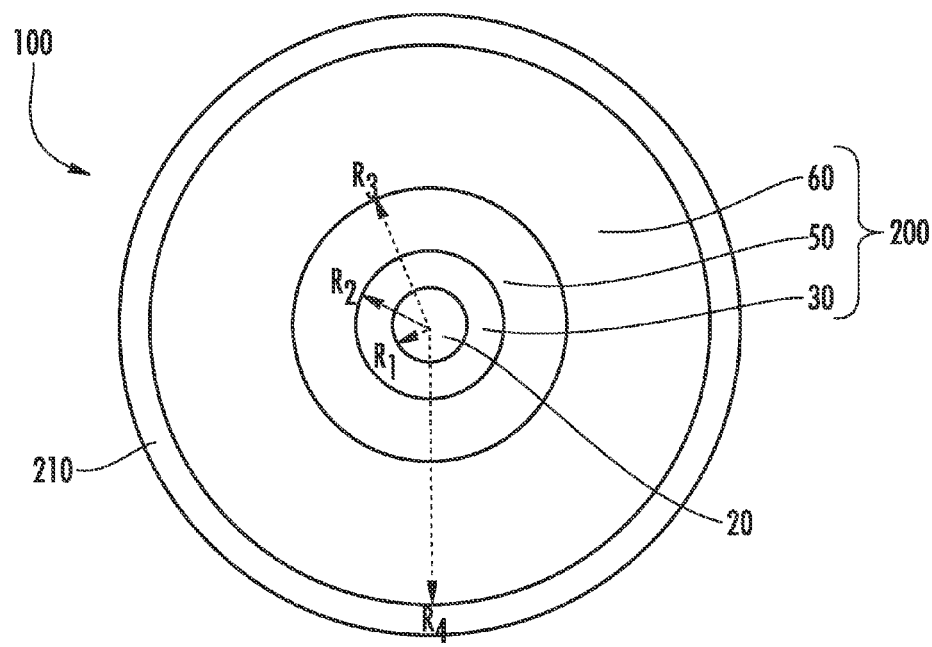
FIG. 2 is a schematic representation (not to scale) of a cross-sectional view of the optical waveguide fiber of FIG. 1.

FIG. 1 shows a schematic representation of the refractive index profile of a cross-section of the glass portion of an embodiment of a multimode optical fiber 100 comprising a glass core 20 and a glass cladding 200, the cladding comprising an inner annular portion 30, a depressed-index annular portion 50, and an outer annular portion 60. FIG. 2 is a schematic representation (not to scale) of a cross-sectional view of the optical waveguide fiber of FIG. 1. The core 20 has outer radius R1 and maximum refractive index delta Δ1MAX. The inner annular portion 30 has width W2 and outer radius R2. Depressed-index annular portion 50 has minimum refractive index delta percent Δ3MIN, width W3 and outer radius R3. The depressed-index annular portion 50 is shown offset, or spaced away, from the core 20 by the inner annular portion 30. The annular portion 50 surrounds and contacts the inner annular portion 30. The outer annular portion 60 surrounds and contacts the annular portion 50. The clad layer 200 is surrounded by at least one coating 210, which may in some embodiments comprise a low modulus primary coating and a high modulus secondary coating.

The inner annular portion 30 has a refractive index profile Δ2(r) with a maximum relative refractive index Δ2MAX, and a minimum relative refractive index Δ2MIN, where in some embodiments Δ2MAX=Δ2MIN. The depressed-index annular portion 50 has a refractive index profile Δ3(r) with a minimum relative refractive index Δ3MIN. The outer annular portion 60 has a refractive index profile Δ4(r) with a maximum relative refractive index Δ4MAX, and a minimum relative refractive index Δ4MIN, where in some embodiments Δ4MAX=Δ4MIN. Preferably, Δ1MAX>Δ2MAX>Δ3MIN. In some embodiments, the inner annular portion 30 has a substantially constant refractive index profile, as shown in FIG. 1 with a constant Δ2(r); in some of these embodiments, Δ2(r)=0%. In some embodiments, the outer annular portion 60 has a substantially constant refractive index profile, as shown in FIG. 1 with a constant Δ4(r); in some of these embodiments, Δ4(r)=0%. The core 20 has an entirely positive refractive index profile, where Δ1(r)>0%. R1 is defined as the radius at which the refractive index delta of the core first reaches value of 0.05%, going radially outwardly from the centerline. Preferably, the core 20 contains substantially no fluorine, and more preferably the core 20 contains no fluorine. In some embodiments, the inner annular portion 30 preferably has a relative refractive index profile Δ2(r) having a maximum absolute magnitude less than 0.05%, and Δ2MAX<0.05% and Δ2MIN>−0.05%, and the depressed-index annular portion 50 begins where the relative refractive index of the cladding first reaches a value of less than −0.05%, going radially outwardly from the centerline. In some embodiments, the outer annular portion 60 has a relative refractive index profile Δ4(r) having a maximum absolute magnitude less than 0.05%, and Δ4MAX<0.05% and Δ4MIN>−0.05%, and the depressed-index annular portion 50 ends where the relative refractive index of the cladding first reaches a value of greater than −0.05%, going radially outwardly from the radius where Δ3MIN is found.

The bend resistant multimode optical fibers may comprise a graded-index core region and a cladding region surrounding and directly adjacent to the core region, the cladding region comprising a depressed-index annular portion comprising a depressed relative refractive index relative to another portion of the cladding. The depressed-index annular portion of the cladding is preferably spaced apart from the core. Preferably, the refractive index profile of the core has a parabolic or substantially curved shape. The depressed-index annular portion may, for example, comprise a) glass comprising a plurality of voids, or b) glass doped with one or more downdopants such as fluorine, boron, individually or mixtures thereof. The depressed-index annular portion may have a refractive index delta less than about −0.2% and a width of at least about 1 micron, the depressed-index annular portion being spaced from said core by at least about 0.5 microns.

In some embodiments, the bend resistant multimode optical fibers comprise a cladding with voids, the voids in some preferred embodiments are non-periodically located within the depressed-index annular portion. "Non-periodically located" means that if takes a cross section (such as a cross section perpendicular to the longitudinal axis) of the optical fiber, the non-periodically disposed voids are randomly or non-periodically distributed across a portion of the fiber (e.g. within the depressed-index annular region). Similar cross sections taken at different points along the length of the fiber will reveal different randomly distributed cross-sectional hole patterns, i.e., various cross sections will have different hole patterns, wherein the distributions of voids and sizes of voids do not exactly match for each such cross section. That is, the voids are non-periodic, i.e., they are not periodically disposed within the fiber structure. These voids are stretched (elongated) along the length (i.e. generally parallel to the longitudinal axis) of the optical fiber, but do not extend the entire length of the entire fiber for typical lengths of transmission fiber. It is believed that the voids extend along the length of the fiber a distance less than about 20 meters, more preferably less than about 10 meters, even more preferably less than about 5 meters, and in some embodiments less than 1 meter.

The multimode optical fiber disclosed herein exhibits very low bend induced attenuation, in particular very low macrobending induced attenuation. In some embodiments, high bandwidth is provided by low maximum relative refractive index in the core, and low bend losses are also provided. Consequently, the multimode optical fiber may comprise a graded index glass core; and an inner cladding surrounding and in contact with the core, and a second cladding comprising a depressed-index annular portion surrounding the inner cladding, said depressed-index annular portion having a refractive index delta less than about −0.2% and a width of at least 1 micron, wherein the width of said inner cladding is at least about 0.5 microns and the fiber further exhibits a 1 turn, 10 mm diameter mandrel wrap attenuation increase of less than or equal to about 0.4 dB/turn at 850 nm, a numerical aperture (NA) of greater than 0.14, more preferably greater than 0.17, even more preferably greater than 0.18, and most preferably greater than 0.185, and an overfilled bandwidth greater than 1.5 GHz-km at 850 nm. By way of example, the numerical aperture for the multimode optical fiber 100 is between about 0.185 and about 0.215.

50 micron diameter core multimode fibers can be made which provide (a) an overfilled (OFL) bandwidth of greater than 1.5 GHz-km, more preferably greater than 2.0 GHz-km, even more preferably greater than 3.0 GHz-km, and most preferably greater than 4.0 GHz-km at an 850 nm wavelength. By way of example, these high bandwidths can be achieved while still maintaining a 1 turn, 10 mm diameter mandrel wrap attenuation increase at an 850 nm wavelength of less than 0.5 dB, more preferably less than 0.3 dB, even more preferably less than 0.2 dB, and most preferably less than 0.15 dB. These high bandwidths can also be achieved while also maintaining a 1 turn, 20 mm diameter mandrel wrap attenuation increase at an 850 nm wavelength of less than 0.2 dB, more preferably less than 0.1 dB, and most preferably less than 0.05 dB, and a 1 turn, 15 mm diameter mandrel wrap attenuation increase at an 850 nm wavelength, of less than 0.2 dB, preferably less than 0.1 dB, and more preferably less than 0.05 dB. Such fibers are further capable of providing a numerical aperture (NA) greater than 0.17, more preferably greater than 0.18, and most preferably greater than 0.185. Such fibers are further simultaneously capable of exhibiting an OFL bandwidth at 1300 nm which is greater than about 500 MHz-km, more preferably greater than about 600 MHz-km, even more preferably greater than about 700 MHz-km. Such fibers are further simultaneously capable of exhibiting minimum calculated effective modal bandwidth (Min EMBc) bandwidth of greater than about 1.5 MHz-km, more preferably greater than about 1.8 MHz-km and most preferably greater than about 2.0 MHz-km at 850 nm.

Preferably, the multimode optical fiber disclosed herein exhibits a spectral attenuation of less than 3 dB/km at 850 nm, preferably less than 2.5 dB/km at 850 nm, even more preferably less than 2.4 dB/km at 850 nm and still more preferably less than 2.3 dB/km at 850 nm. Preferably, the multimode optical fiber disclosed herein exhibits a spectral attenuation of less than 1.0 dB/km at 1300 nm, preferably less than 0.8 dB/km at 1300 nm, even more preferably less than 0.6 dB/km at 1300 nm.

In some embodiments, the core extends radially outwardly from the centerline to a radius R1, wherein 10≤R1≤40 microns, more preferably 20≤R1≤40 microns. In some embodiments, 22≤R1≤34 microns. In some preferred embodiments, the outer radius of the core is between about 22 to 28 microns. In some other preferred embodiments, the outer radius of the core is between about 28 to 34 microns.

In some embodiments, the core has a maximum relative refractive index, less than or equal to 1.2% and greater than 0.5%, more preferably greater than 0.8%. In other embodiments, the core has a maximum relative refractive index, less than or equal to 1.1% and greater than 0.9%.

In some embodiments, the optical fiber exhibits a 1 turn, 10 mm diameter mandrel attenuation increase of no more than 1.0 dB, preferably no more than 0.6 dB, more preferably no more than 0.4 dB, even more preferably no more than 0.2 dB, and still more preferably no more than 0.1 dB, at all wavelengths between 800 and 1400 nm. Optical fiber 100 is also disclosed in U.S. patent application Ser. No. 12/250,987 filed on Oct. 14, 2008 and Ser. No. 12/333,833 filed on Dec. 12, 2008, the disclosures of which are incorporated herein by reference.

Figure 3:
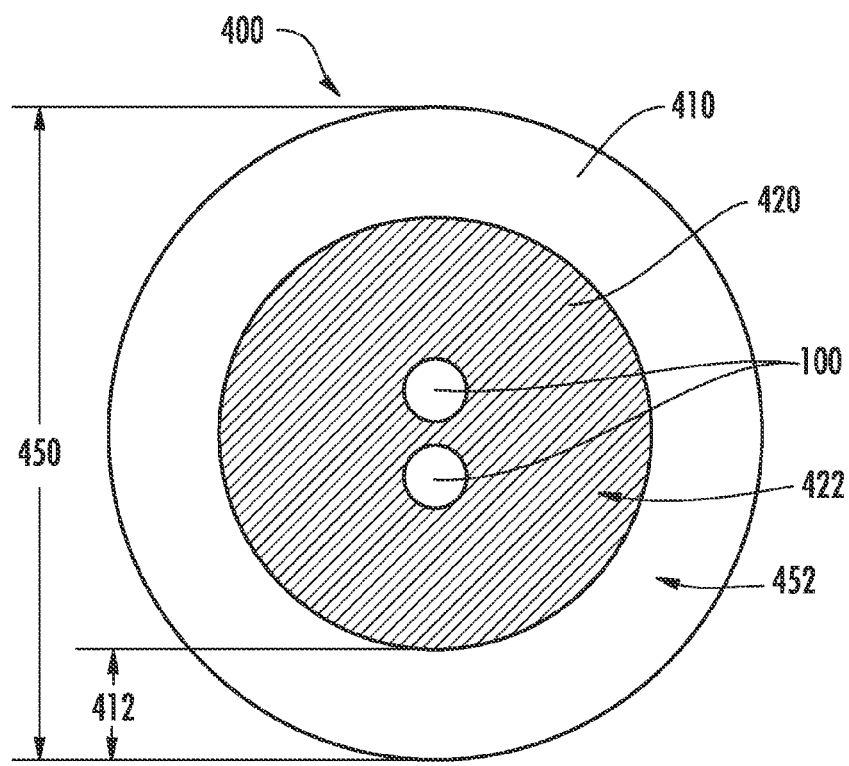
FIG. 3 is a cross-sectional view of a duplex cable according to a first embodiment.

FIG. 3 is a cross section of a duplex cable 400 according to one embodiment. The cable 400 includes a cable jacket 410, a strain-relief element 420 enclosed in the cable jacket 410, and two optical waveguides enclosed within the cable jacket 410. In the illustrated embodiment, the optical waveguides correspond to the optical fiber 100 illustrated in FIGS. 1-2, although other bend-insensitive fibers may be used. The cable jacket 410 has a thickness 412. The cable 400 has a diameter 450 and a cross-sectional area 452 defined by the outer perimeter of the cable jacket 410. The cross-section of the cable 400 may not be perfectly circular so the term "diameter" as used herein indicates a nominal or average diameter. In the illustrated embodiments, the strain-relief element 420 comprises longitudinally-extending tensile yarns that occupy a free space area 422 in the cable jacket 410. The cable jacket 410 is constructed from a polymer.

Example 1

A cable 400 as shown in FIG. 3 has a diameter 450 of 2.0 mm, a cross-sectional area 452 of 3.4 mm², and a jacket wall thickness 412 of 0.30 mm. The strain-relief element 420 was formed from four ends of 1420 denier unstranded aramid tensile yarn that occupies nominally 0.9032 mm² area in the cable interior. The optical waveguides 100 occupy an area 0.0982 mm², leaving 0.5280 mm² of free space 422. The jacket 410 was made from PVC.

According to the above embodiment, the free space 422 allows the fibers 100 to move about within the interior of the cable jacket 410 so as to reduce bending stresses on the fibers. The tensile yarns 420, which may be unstranded, fluff out and fill the free space 422 but not to a degree that they unduly restrict movement of the fibers 100.

The illustrated embodiment has a diameter 450 of 2.0 mm. Exemplary alternative diameters 450 that can be utilized are 2.9 mm, 2.4 mm, and 1.65 mm.

Figure 4:
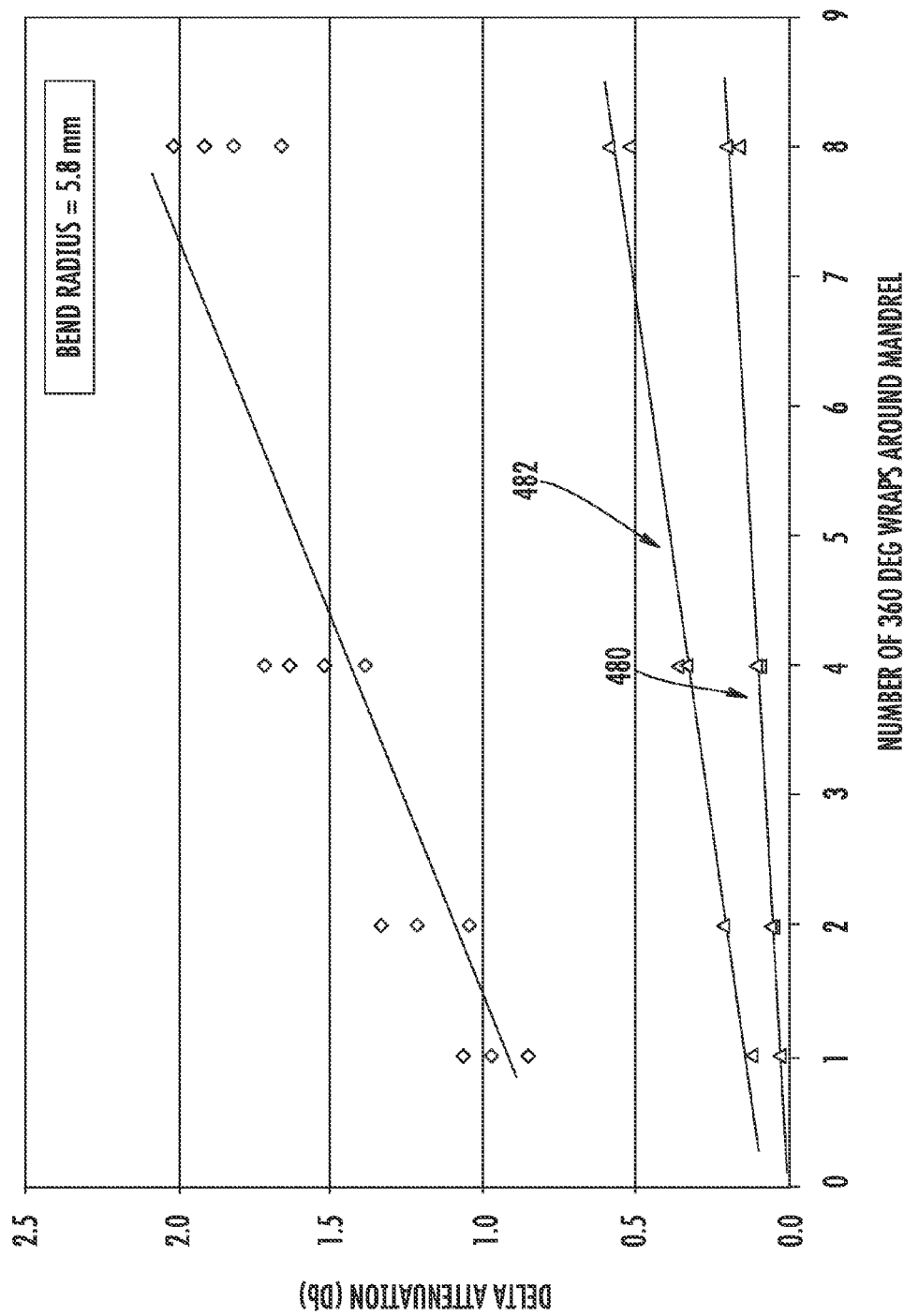
FIG. 4 is a plot of delta attenuation in various cables when wrapped around a mandrel having a bend radius of 5.8 mm, at 850 and 1300 nm.

FIG. 4 is a plot of delta attenuation in various cables when wrapped around a mandrel having a bend radius of 5.8 mm, at 850 and 1300 nm. Data utilizing optical fibers 100 for a cable 400 as shown in FIG. 1 at 850 nm are generally indicated by reference number 480, and at 1300 nm are indicated by reference number 482. The remaining data indicate delta attenuation values for a similar cable incorporating a conventional multimode fiber. As shown in FIG. 4, for four full wraps around a 5.8 mm bend radius and at both 850 nm and 1300 nm, delta attenuation of the cable 400 due to the wraps is less than 1.0 dB, more specifically less than 0.5 dB. For two full wraps around a 5.8 mm bend radius and at both 850 nm and 1300 nm, delta attenuation of the cable 400 due to the wraps is less than 1.0 dB, more specifically less than 0.5 dB, and still more specifically less than 0.25 dB.

The cable 400 also has ease of accessibility of the fibers 100, with a relatively small cross-sectional area 452 while maintaining high resistance to attenuation due to bending.

Although the above embodiments are described as incorporating optical fibers 100 as waveguides, alternative optical waveguides may be used. For example, optical fibers available under the name ClearCurve®, available from Corning Incorporated of Corning N.Y. may be utilized.

Figure 5:
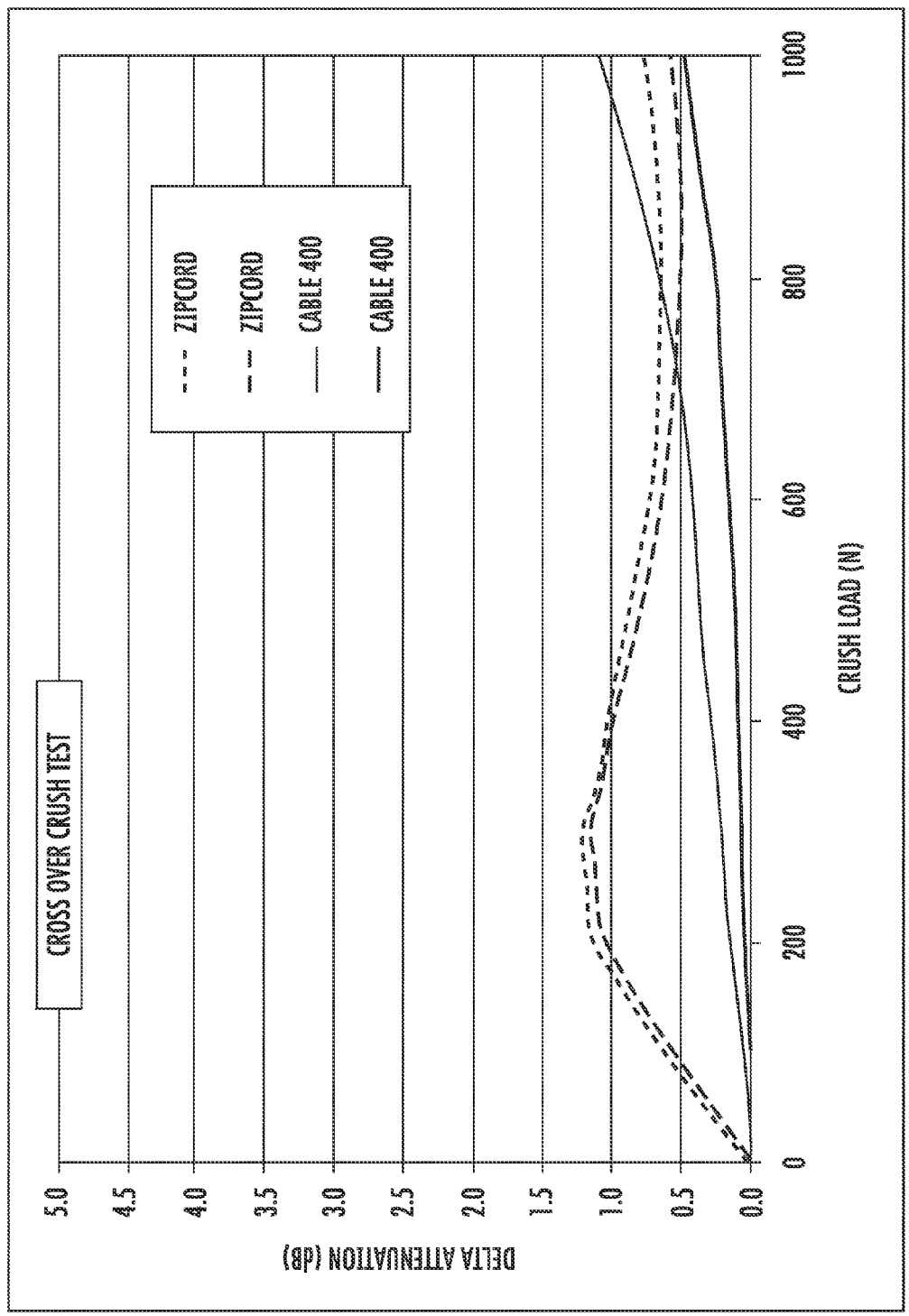
FIG. 5 is a plot of crush resistance of the cable of FIG. 3 and a conventional zipcord cable in a cross over crush test.

FIG. 5 is a plot of crush resistance of the cable 400 and a conventional zipcord cable in a cross over crush test. In the cross over crush test, the cables are laid across itself in an "X" pattern between two flat steel plates. Optical attenuation in the cables is then measured as the load on the plates is increased. Attenuation in cable 400 was less than in the zipcord cable even though less material is used to form the cable 400.

Figure 6:
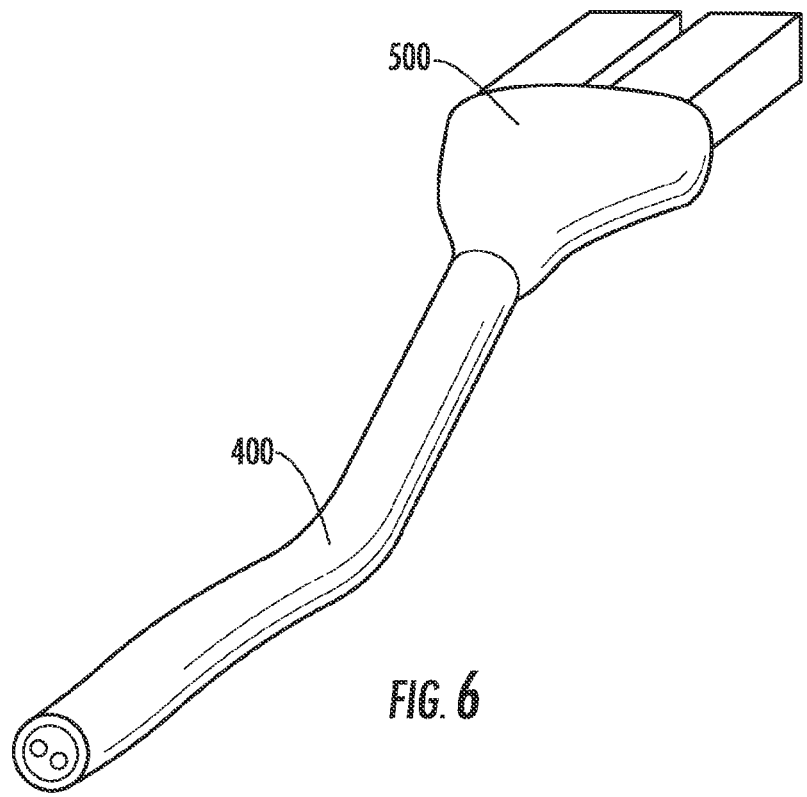
FIG. 6 illustrates the cable of FIG. 3 connectorized to LC Duplex Uniboot Connector.

FIG. 6 illustrates the cable 400 connectorized to LC Duplex Uniboot Connector 500. Mating of the cable 400 with the connector 500 is more convenient than conventional zipcord cables.

Figure 7:
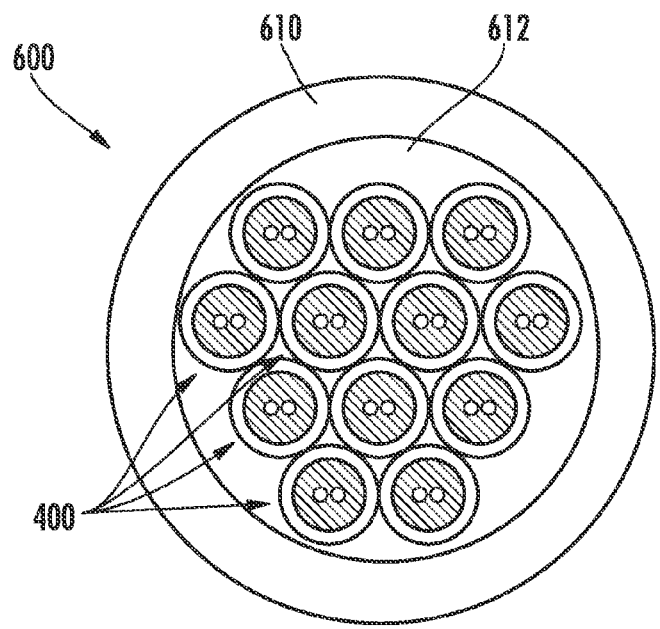
FIG. 7 is a cross-sectional view of a breakout cable incorporating a plurality of duplex cables.

FIG. 7 is a cross-sectional view of a breakout or fanout cable 600 incorporating a plurality of duplex cables 400 (or "breakout units") as illustrated in FIG. 3. The duplex units 400 are enclosed within an outer jacket 610 defining a cable interior 612. The illustrated cable 600 includes twelve duplex units 400, for a total fiber count of twenty-four. The duplex units 400 may have a smaller diameter than the example shown in FIG. 3. For this reason, the cables in a fanout cable are sometimes referred to as "breakout units" rather than "cables." For example, the diameter of the duplex units 400 incorporated in the breakout cable 600 can be 2.0 mm or less. The wall thickness of the duplex units 400 can be less be less than 0.25 mm, and can even be less than 0.20 mm. To increase tensile strength, the breakout cable 600 can include a central strength member, such as a coated glass-reinforced plastic (GRP) rod.

Example 2

A breakout cable 600 includes twelve duplex cables or units 400 with outside diameter of 1.65 mm and jacket wall thickness of 0.18 mm. The strain-relief elements 420 are formed from unstranded aramid tensile yarn. The units jackets 410 are made from PVC.

Figure 8:
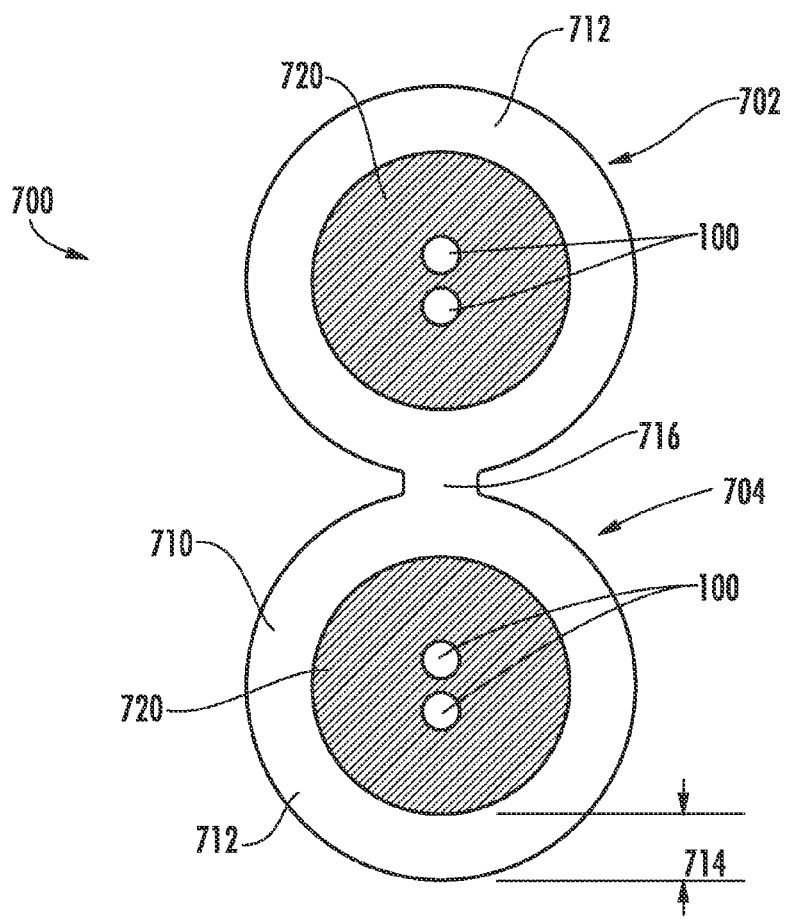
FIG. 8 is a cross-sectional view of a zipcord cable.

FIG. 8 is a cross-sectional view of a zipcord cable 700 comprised of a first duplex cable 702 and a second duplex cable or unit 704 joined to the first cable 702. The zipcord cable 700 is suitable for applications such as, for example, to cross connect jumper panels. Each duplex cable 702, 704 may be similar or identical in size, composition and shape to the duplex cables 400, and include a cable jacket 712 of thickness 714 and joined by a web 716. Each cable 702, 704 includes a strain-relief element 720 enclosed in the cable jacket 712, and two optical waveguides 100.

According to the above embodiment, the free space in the duplex cable or unit jackets allows the fibers 100 to move about within the interior of the cable jackets 712 so as to reduce bending stresses on the fibers. The tensile yarns 720, which may be unstranded, fluff out and fill the free space but not to a degree that they unduly restrict movement of the fibers 100.

According to one aspect of the present embodiments, tensile yarns may occupy a cross-sectional area that is less than 33 percent of the cross-sectional area of a cable, or even a low as 30 percent or less of the cross-sectional area. Concomitantly, the free space within the jacket may be as high as 13 percent or more of the cross-sectional area of the cable, or even as high as 15 percent.

The multimode fiber optic cables disclosed herein can have any suitable rating such as riser, plenum, general-purpose, low-smoke zero-halogen (LSZH), or the like. Likewise, any suitable type of material may be used for the protective covering (i.e., the buffer layer or jacket) such as polyurethanes (PU), polyvinylchloride (PVC), polyethylenes (PE), polyproplyenes (PP), UV curable materials, etc. depending on the desired construction and characteristics. By way of example, a multimode optical fiber 100 may include a plenum-grade buffer layer with an outer diameter of about 900 microns.

In general, the duplex cables disclosed in this specification may have outside diameters of 1.6, 2.0, and 2.8 mm. Electrically conductive wires or twisted pairs of wires may be substituted for one or more of the duplex cables in the breakout cable 600.

An encircled flux (EF) launch is used for testing the optical performance of multimode fiber optic assemblies disclosed herein. The EF launch into the core of the multimode optical fiber fills the core of the optical fiber with a specific profile (i.e., specific percentage of power within a given radii from the center of the optical fiber). More specifically, EF is determined by the near field measurement of the optical signal at the launch end of the optical fiber. The measured near field result is a function I(r), of radius, r, away from the optical center of the core, which is used to generate the EF function given by Equation (1) below.

$$EF(r) = \frac{\int_0^r xI(x)\,dx}{\int_0^R xI(x)\,dx} \quad \text{Equation (1)}$$

"R" is an integration limit defined as 1.15× of the nominal core radius. The EF launch is a set of particular radial control points that are defined by an EF upper limit and an EF lower limit of encircled flux values for the particular radial control points. A compliant EF launch falls within the defined upper and lower limits for the particular control points, otherwise the launch is either overfilled or underfilled.

The optical performance of multimode fiber optic assemblies is surprisingly impressive compared with conventional multimode fiber optic assemblies. Testing was performed to quantify the improved performance of multimode fiber optic assemblies disclosed herein. Specifically, the performance of the multimode fiber optic assemblies were compared with conventional multimode fiber optic assemblies having a 50 micron core multimode optical fiber available from Corning, Inc. of Corning, N.Y. under the tradename InfiniCor® SX+. Different types of testing were conducted to evaluate performance under different conditions encountered by the craft. For instance, testing was conducted to determine the insertion loss of the multimode fiber optic assemblies. Insertion loss is the optical attenuation that occurs between mated fiber optic connectors and is used for determining budget losses in an optical network. For instance, the design of the optical network may allow for total insertion loss of 0.5 dB and if each mated fiber optic connector pair has an average insertion loss of 0.1 dB, then the design would be limited to a maximum of five fiber optic connector pairs to meet the loss budget for the optical network. Consequently, improved insertion loss is valuable for optical networks. Bend performance testing was also performed to determine multimode fiber optic assembly performance when wrapped into relatively small bend diameters. Preserving optical performance of multimode fiber optic assemblies during bending is advantageous since optical networks typically include many bends during routing, slack storage and the like. Moreover, preserving optical performance during bending may allow for tighter routing, increased density and/or smaller footprints for fiber optic hardware.

Insertion loss testing was performed using multimode fiber optic assemblies for comparison with conventional multimode fiber optic assemblies as discussed above. Generally speaking, multimode fiber optic assemblies have about one-half or less of the insertion loss compared with similar conventional multimode fiber optic assemblies. By way of example, multimode fiber optic assemblies disclosed herein have an insertion loss of about 0.04 dB or less per mated connector pair, which is about half of the insertion loss of a similar conventional multimode fiber optic mated pair.

The foregoing is a description of various embodiments that are given here by way of example only. Although multimode fiber optic cables assemblies including bend performance fiber in at least a portion thereof have been described with reference to preferred embodiments and examples thereof, other embodiments and examples may perform similar functions and/or achieve similar results. All such equivalent embodiments and examples are within the spirit and scope of the disclosure and are intended to be covered by the appended claims.

We claim:

1. A duplex cable having a cross-sectional area, the cable comprising:
   a polymer jacket having a diameter of less than 3.0 mm;
   only two optical waveguides enclosed within the jacket; and
   a strain-relief component comprised of tensile yarns enclosed within the jacket and contacting the optical waveguides,
   wherein the tensile yarns are unstranded, wherein the tensile yarns occupy a cross-sectional area that is less than 33 percent of the cross-sectional area of the cable, and wherein free space inside the polymer jacket occupies at least 13 percent of the cross-sectional area of the cable, wherein the free space in the duplex cable allows the two optical waveguides to move about within the interior of the jacket so as to reduce bending stresses on the two optical waveguides, and wherein the tensile yarns are fluffed out and fill the free space but not to a degree that the tensile yarns unduly restrict movement of the two optical waveguides.

2. The duplex cable of claim 1, wherein when the cable is wrapped around a 5.8 mm mandrel four times, delta attenuation due to the wraps is less than 1.0 dB at 1300 nm; and at 850 nm.

3. The duplex cable of claim 1, wherein the tensile yarns comprise unstranded aramid yarns.

4. The duplex cable of claim 3, wherein the duplex cable has a cable diameter of about 2.0 mm.

5. The duplex cable of claim 4, wherein a free space area inside the cable jacket occupies at least 15 percent of the cross-sectional area of the cable.

6. The duplex cable of claim 1, wherein the waveguides are bend resistant multimode optical fibers.

7. The duplex cable of claim 6, wherein the bend resistant multimode optical fibers comprise a graded-index core and wherein the cladding, including the at least one annular region and the outer annular region, is surrounding and directly adjacent to the core.

8. The duplex cable of claim 7, wherein the core has a 50 micron diameter.

9. The duplex cable of claim 8, wherein the core has an overfilled bandwidth of greater than 1.5 GHz-km.

10. The duplex cable of claim 9, wherein the bend resistant multimode optical fibers exhibit a spectral attenuation of less than 3 dB/km at 850 nm.

11. The duplex cable of claim 1, wherein the waveguides are optical fibers, each optical fiber having a core where the core contains no fluorine.

12. The duplex cable of claim 1, wherein the optical fibers are bend resistant multimode optical fibers.

13. A zipcord cable having a cross-sectional area, the cable comprising:

a first duplex cable and a second duplex cable, the first duplex cable comprising:
 a polymer jacket having a diameter of less than 3.0 mm;
 only two optical waveguides enclosed within the jacket; and
 a strain-relief component comprising tensile yarns enclosed within the jacket and contacting the optical waveguides, wherein the strain-relief component comprises aramid yarns, wherein the tensile yarns are unstranded,
 wherein the tensile yarns occupy a cross-sectional area that is less than 33 percent of the cross-sectional area of the cable, and
 wherein free space inside the cable jacket occupies at least 13 percent of the cross-sectional area of the cable; and
a web integral to and connecting the jackets of the first and second duplex cables.

14. The zipcord cable of claim 13, wherein the waveguides are bend resistant multimode optical fibers.

15. A duplex cable, comprising:
a jacket defining the exterior of the duplex cable, wherein the jacket has an outer diameter of about 2.0 mm and a wall thickness of about 0.30 mm;
a strain-relief element formed from tensile yarns, wherein the tensile yarns are unstranded, wherein the tensile yarns occupy a cross-sectional area that is less than 33 percent of the cross-sectional area of the cable, wherein free space inside the cable jacket occupies at least 13 percent of the cross-sectional area of the cable; and
only two optical fibers, wherein the free space allows the fibers to move about within an interior of the jacket so as to reduce bending stresses on the fibers, wherein the tensile yarns are fluffed out and fill the free space but not to a degree that the tensile yarns unduly restrict movement of the fibers.

16. The duplex cable of claim 15, wherein the strain-relief element is formed from four tensile yarns of aramid, each about 1420 denier.

17. The duplex cable of claim 15, wherein the jacket thereby includes about 0.5280 $mm^2$ of free space.

18. The duplex cable of claim 15, wherein the tensile yarns occupy about 0.9032 $mm^2$ of the interior of the jacket.

* * * * *